(12) United States Patent
Chang et al.

(10) Patent No.: US 12,346,219 B2
(45) Date of Patent: Jul. 1, 2025

(54) METHOD FOR A CHARGING UNIT THAT BACKS UP DATA STORED ON A MOBILE DEVICE

(71) Applicant: VINPOWER INC., Alhambra, CA (US)

(72) Inventors: Calvinson Chang, Alhambra, CA (US); Stanley Chu, Alhambra, CA (US); Chihhan Chou, Alhambra, CA (US)

(73) Assignee: Vinpower Inc., Alhambra, CA (US)

( * ) Notice: Subject to any disclaimer, the term of this patent is extended or adjusted under 35 U.S.C. 154(b) by 16 days.

(21) Appl. No.: 17/352,762

(22) Filed: Jun. 21, 2021

(65) Prior Publication Data

US 2022/0405175 A1 Dec. 22, 2022

(51) Int. Cl.
*G06F 11/14* (2006.01)
*H02J 7/00* (2006.01)

(52) U.S. Cl.
CPC ...... *G06F 11/1464* (2013.01); *G06F 11/1451* (2013.01); *H02J 7/00045* (2020.01); *H02J 7/0049* (2020.01); *G06F 2201/84* (2013.01)

(58) Field of Classification Search
CPC ............. G06F 11/1464; G06F 11/1451; G06F 2201/84; H02J 7/00045; H02J 7/0049
See application file for complete search history.

(56) References Cited

U.S. PATENT DOCUMENTS

| | | | |
|---|---|---|---|
| 7,146,387 B1* | 12/2006 | Russo | G06F 11/1458 |
| 2004/0260973 A1* | 12/2004 | Michelman | G06F 11/1464 714/13 |
| 2007/0139365 A1* | 6/2007 | Li | G06F 9/44505 345/156 |
| 2009/0170569 A1* | 7/2009 | Anzai | H04M 1/72409 455/573 |
| 2017/0185431 A1* | 6/2017 | Lv | G06F 9/44521 |
| 2017/0310366 A1* | 10/2017 | Ben David | G06F 3/065 |
| 2017/0331329 A1* | 11/2017 | Kim | H04B 5/0031 |
| 2019/0132431 A1* | 5/2019 | Ziv | H04B 5/0031 |
| 2020/0133783 A1* | 4/2020 | Kumar | G06F 11/3409 |
| 2020/0285546 A1* | 9/2020 | Kraplanee | G06F 16/116 |
| 2020/0358316 A1* | 11/2020 | Shirsat | H02J 7/007192 |
| 2023/0114452 A1* | 4/2023 | Li | G06F 11/14 714/6.3 |

FOREIGN PATENT DOCUMENTS

| | | |
|---|---|---|
| CN | 107493373 A | 12/2017 |
| CN | 211015476 U | 7/2020 |
| TW | M443232 U | 12/2012 |
| TW | 202028999 A | 8/2020 |

* cited by examiner

*Primary Examiner* — Tony Wu
(74) *Attorney, Agent, or Firm* — Rosenberg, Klein & Lee

(57) ABSTRACT

An App executed on a mobile device will create a user profile block in the memory unit of a charging unit, and help set up charging preferences and backup preferences in the profile block, and create a backup folder to store backup files from the mobile device. The App will monitor the charging of the mobile device. According to the backup preferences, the App performs a full backup task or a differential backup task for only local files, only cloud files or both; the App sets the data transmission speed between the charging unit and the mobile device; the App performs a full scan or a quick scan on the files in the mobile device and the files in the backup folder to determine between the mobile device and the backup folder whether the files are the same; and creates quick scan index data for the first time backup files.

11 Claims, 4 Drawing Sheets

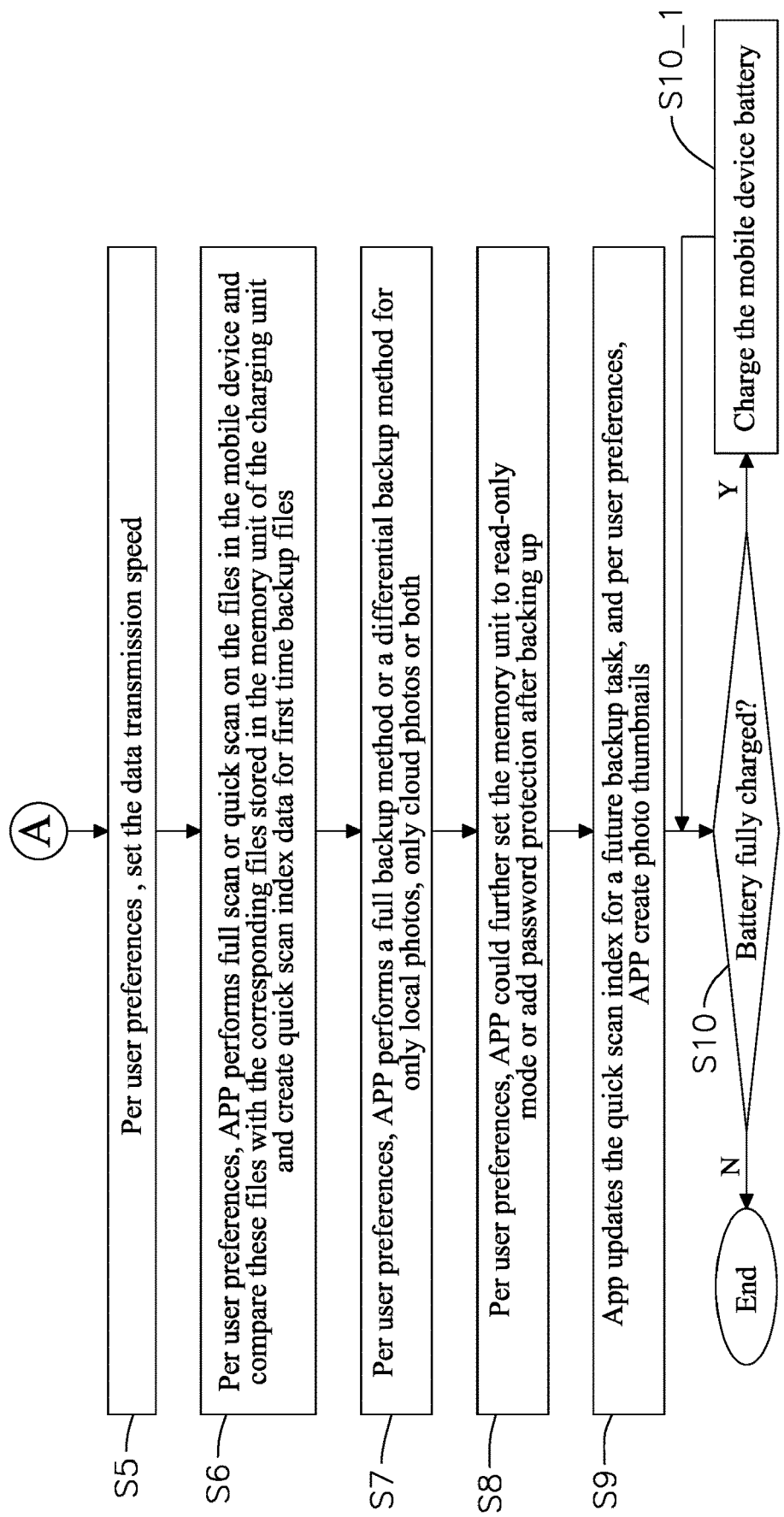

METHOD FOR A CHARGING UNIT THAT BACKS UP DATA STORED ON A MOBILE DEVICE

BACKGROUND OF THE INVENTION

1. Field of the Invention

The present invention relates to a method for backing up data, especially a method for a charging unit that backs up data stored on a mobile device while charging the mobile device.

2. Description of the Related Art

Mobile phones or tablets, collectively "Mobile Devices", have become an indispensable part of modern life. Statistically, the amount of data stored in mobile devices is increasing day by day. Therefore, backing up data stored on mobile devices has become a routine chore that mobile device users must face. There are currently many ways to back up the data stored on the mobile device, such as backing up the data to an external device or personal computer via a mobile device cable, or backing up data to a cloud storage space, etc. However, even with the multitudes of currently available backup methods, most mobile device users still tend to neglect the acts of backing up the data stored on their mobile devices. This failure to back up the data on their mobile devices leads to many mobile device users occasionally losing part or all of the data stored on their mobile devices which could occur due to various reasons.

Why do so many mobile device users tend to neglect backing up the data stored on their mobile devices? Possible explanations are that the mobile device users are not familiar with or do not know how to perform data backup operations. Even for those users that do know how to perform data backup, they are burdened by the operations of performing a data backup to such a degree that they cannot diligently perform data backup on a regular basis.

Hence, there are urgent needs to automate the data backup process for mobile devices so that ordinary users of mobile devices can effortlessly utilize the data backup functionality.

SUMMARY OF THE INVENTION

In view of the above-mentioned needs, the main purpose of the present invention is to provide a charging unit to automatically back up files while charging a mobile device, and the method for a charging unit that backs up data stored on a mobile device of the present invention is as follows.

Firstly, provide a charging unit, and an application program (abbreviated as App, hereinafter) executed on a mobile device. The charging unit includes a memory unit and the mobile device includes a battery, and the method for a charging unit that backs up data stored on a mobile device of the present invention includes the following steps:

S1: the App on the mobile device determines whether the mobile device has ever connected with the charging unit; if the mobile device has ever connected with the charging unit, jump to S2;

S1_1: the App creates a user profile block in the memory unit of the charging unit, and sets up charging preferences and backup preferences in the user profile block, wherein the charging preferences include an expected charge level for the battery;

S2: the App determines whether the mobile device has ever backed up files in the charging unit; if the mobile device has ever backed up files in the charging unit, jump to S3;

S2_1: the App creates a new backup folder in the memory unit;

S3: the App chooses the corresponding backup folder to store backup files from the mobile device;

S4: the App determines whether a battery charge level of the battery of the mobile device is less than the expected charge level. If the battery charge level is not less than the expected charge level, jump to the next step of S4_1;

S4_1: the App controls the charging unit to charge the battery of the mobile device for a unit time, return to S4;

S7: according to the backup preferences, the App performs a full backup task or a differential backup task for only local files, only cloud files, or both.

Preferably, the following steps are further included between step S4_1 and step S7:

S5: according to the backup preferences, the App sets a data transmission speed between the charging unit and the mobile device;

S6: according to the backup preferences, the App performs a full scan or a quick scan on the files in the mobile device and compares with the files in the backup folder to determine whether the files are the same between the mobile device and the backup folder. The App creates quick scan index data for first time backup files.

Preferably, the following steps are further included after step S7:

S8: according to the backup preferences, the App determines whether to set the files in the backup folder as read-only, and whether to set password protection for the files in the backup folder;

S9: according to the backup preferences, the App determines whether to generate thumbnails for the files in the backup folder; and the App updates the quick scan index data.

Preferably, the following steps are further included after step S9:

S10: the App determines whether the battery of the mobile device is fully charged, and if the battery is fully charged, then the App ends the procedure;

S10_1: the App controls the charging unit to charge the battery of the mobile device for a unit time, then return to S10.

Preferably, the following steps are further included before step S1:

S0_0: the mobile device is connected to the charging unit and the connection is authenticated;

S0_1: the mobile device decides whether the App has been installed; if the App is installed on the mobile device, then jump to step 1;

S0_2: the mobile device reminds the user of the mobile device to install the App.

Preferably, the backup preferences include data transmission speed option data, quick scan/full scan option data, full backup/differential backup option data, local/cloud/both backup option data, backup folder read-only option data, backup folder password option data, and thumbnail option data.

Preferably, when the App creates a backup folder, the App also creates a backup folder pointer in the user profile block to point to the backup folder.

Preferably, when the App creates a user profile block in the memory unit of the charging unit, the App also writes an identification code of the mobile device into the user profile block.

Preferably, the differential backup task means that among the selected files to be backed up from the mobile device, only those files that are different from the files in the backup folder are backed up by the App.

Preferably, when the App backs up a batch of data files for the first time, the App will record the relevant information including file names, file sizes and file dates of the batch of data files as a quick scan index data of the batch of data files, and the quick scan index data is recorded in the mobile device and the backup folder respectively; and later on, when comparing the files in the mobile device with the files in the backup folder, the App only needs to check the quick scan index data to determine whether the files in the mobile device and the files in the backup folder are the same.

BRIEF DESCRIPTION OF THE DRAWINGS

FIGS. 3A, 3B are flowcharts for the method for a charging unit that backs up data stored on a mobile device of the present invention.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
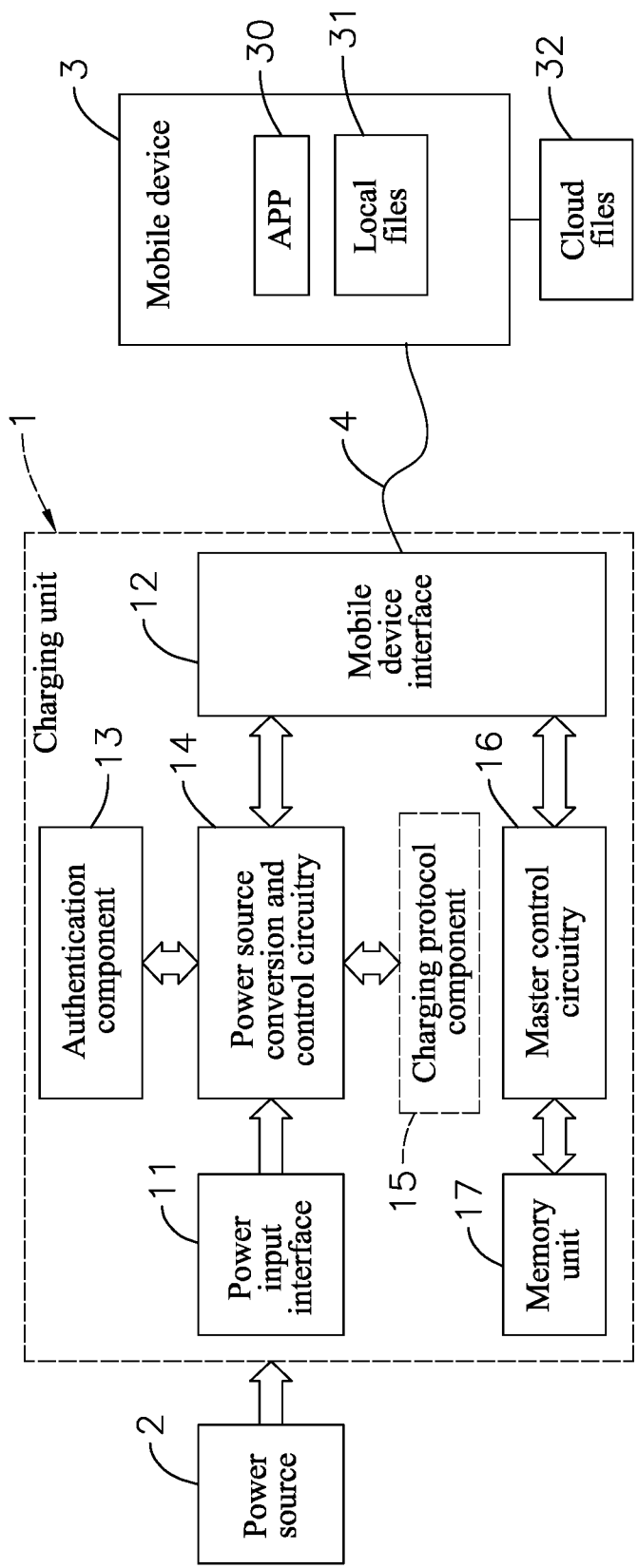
FIG. 1 is a schematic diagram of the charging unit of the present invention.

Please refer to FIG. 1. FIG. 1 is a schematic diagram of the charging unit 1 of the present invention. The charging unit 1 of the present invention includes a power input interface 11, a mobile device interface 12, an authentication component 13, a power conversion and control circuitry 14, a charging protocol component 15, a master control circuitry 16 and a memory unit 17.

The power input interface 11 is used to connect to a power source 2. The power input interface 11 can be compatible with connection interfaces such as Universal Serial Bus (USB) TYPE A, USB TYPE C, or Lightning, etc. The mobile device interface 12 is used to connect a first end of a cable 4, while a second end of the cable 4 is connected to the mobile device 3. The mobile device interface 12 can be compatible with USB TYPE A, USB TYPE C, or Lightning, etc. In this way, the charging unit 1 of the present invention is connected to the mobile device 3 via the cable 4, and the charging unit 1 of the present invention can provide power to the mobile device 3. The cable 4 can be a mobile phone cable for charging and data transmission, such as a USB_A to Lightning cable, a Lightning to USB_C cable, a USB_A cable, a USB_C cable, a Lightning cable, or a USB_A to USB_C cable, etc.

The authentication component 13 can be an integrated circuit (IC), which is used for the mobile device 3 to authenticate the charging unit 1 of the present invention. For example, the authentication component 13 may be an MFi (Made For iPhone/iPod/iPad) chip, so that an Apple® mobile device 3 can authenticate the charging unit 1 of the present invention as a qualified device through the MFi chip when the charging unit 1 is connected to the Apple® mobile device 3. The power conversion and control circuitry 14 communicates with the mobile device 3 in cooperation with the charging protocol component 15 and outputs appropriate voltage and current to the mobile device 3 to charge a rechargeable battery (abbreviated as a battery, hereinafter) of the mobile device 3.

The cable 4 can be used to transmit data and power. The master control circuitry 16 communicates with the mobile device 3 via the mobile device interface 12 and the cable 4, so that the mobile device 3 can back up its data to the memory unit 17. The master control circuitry 16 can be a microcontroller, a central processing unit (CPU), a programmable logic array (FPGA) or an application-specific integrated circuit (ASIC). The memory unit 17 can be static memory (SRAM), dynamic memory (DRAM), magnetic memory (MRAM), flash memory (FLASH memory), etc., or a combination thereof. Moreover, the memory unit 17 can also be an external memory device, such as a hard disk drive (HDD), a solid state drive (SSD), an SD memory card, a USB flash drive, and so on.

Figure 2:
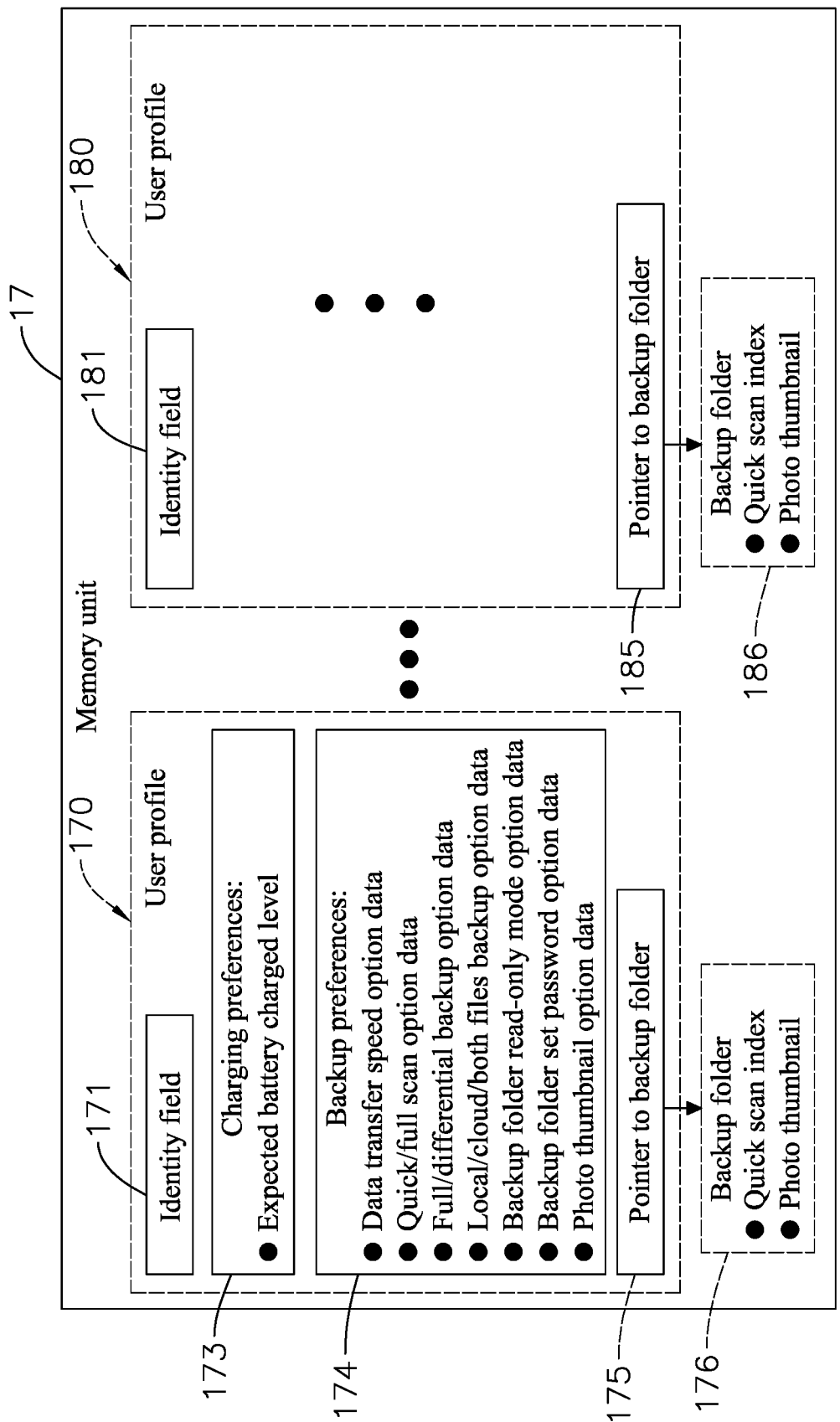
FIG. 2 shows the contents of the memory unit of the charging unit of the present invention.

Please refer to FIG. 2. FIG. 2 shows the contents of the memory unit 17. The memory unit 17 is used to store information of multiple mobile devices 3, wherein, with respect to each mobile device 3, a user profile block 170 corresponding to a respective mobile device 3 is created in the memory unit 17. The user profile block 170 includes an identity field 171 for storing an identification code of the mobile device, such as a mobile handset International Mobile Equipment Identity (IMEI) number, charging preferences 173, backup preferences 174, and a backup folder pointer 175 specifically for the respective mobile device 3. Wherein the backup folder pointer 175 points to a backup folder 176 which is also specifically for the respective mobile device 3. The charging preferences 173 include an expected charge level for the battery of the mobile device 3; and the backup preferences 174 include a data transmission speed option data, a quick scan/full scan option data, a full backup/differential backup option data, a local/cloud/both backup option data, a backup folder read-only option data, a backup folder password option data, and a thumbnail option data, etc. In addition, the backup folder 176 of the memory unit 17 not only stores the backup data of the mobile device 3 such as local files 31 and cloud files 32, but also includes quick scan index data and thumbnail data. In FIG. 2, there are multiple user profile blocks 170, 180, which respectively include backup folder pointers 175, 185 pointing to backup folders 176, 186, respectively. Accordingly, the charging unit 1 can provide data backup functions for multiple mobile devices.

Figure 3A:
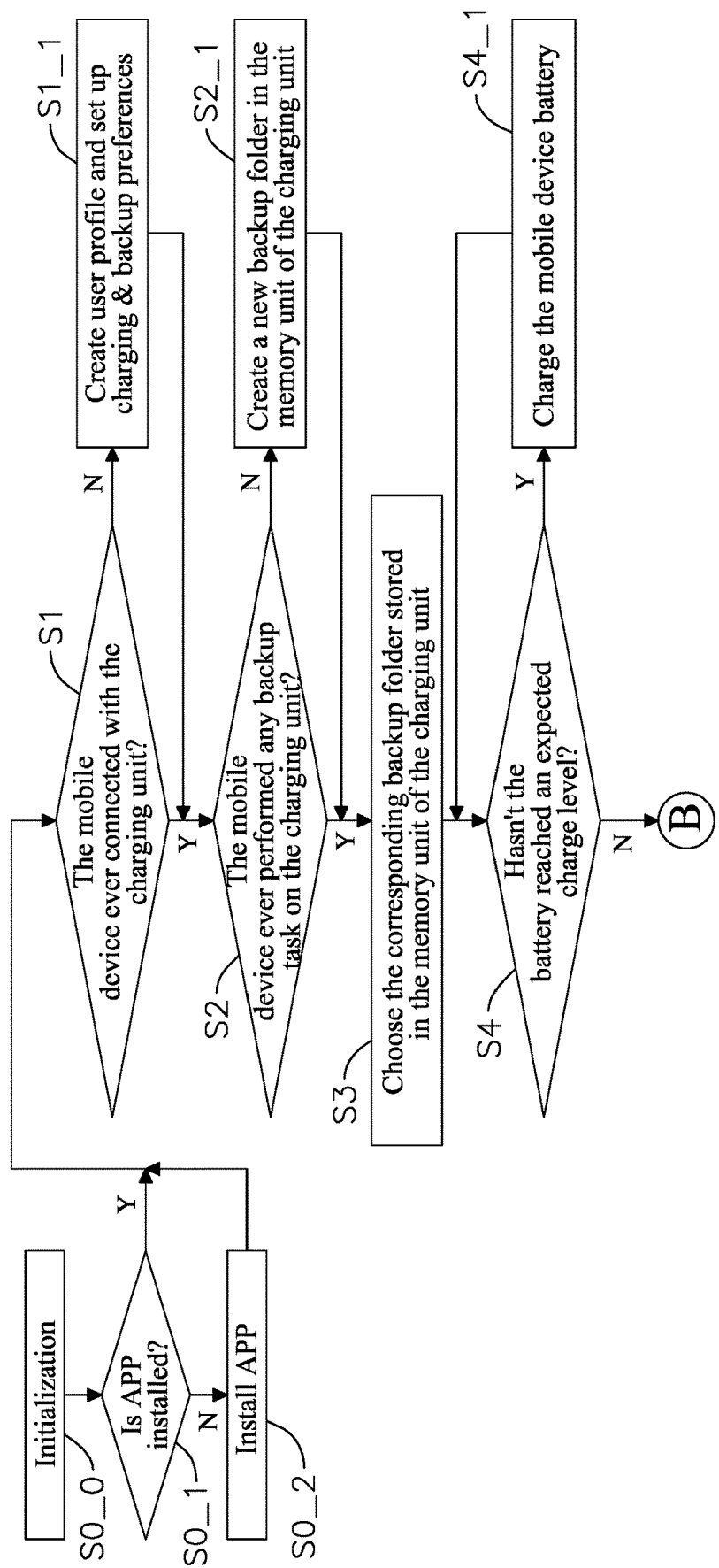

Please refer to FIGS. 1-3A, 3B. FIGS. 3A, 3B are about the method for a charging unit that backs up data stored on a mobile device of the present invention. The mobile device 3 must execute an application program (abbreviated as App, hereinafter) 30 to automatically back up the data accessible from the mobile device 3 to the memory unit 17 of the charging unit 1. In the initialization step 0_0 (S0_0) in FIG. 3A, the mobile device 3 must be connected to the charging unit 1 via the cable 4, and then the mobile device 3 is recognized by the charging unit 1 via the authentication component 13 and the power conversion and control circuitry 14. Then, the App 30 will be able to control the charging unit 1 to supply power to the mobile device 3.

Wherein the data accessible from the mobile device 3 includes local files 31 and cloud files 32, which could be, but are not limited to, photos.

Then, in step 0_1 (S0_1) in FIG. 3A, the mobile device 3 decides whether the App 30 has been installed. If the mobile device 3 has not yet installed the App 30, then in step 0_2 (S0_2) in FIG. 3A, the mobile device 3 will remind the user of the mobile device 3 to install the App 30.

After the mobile device 3 confirms that the App 30 has been installed, then in step 1 (S1) in FIG. 3A, the App 30 will confirm whether the mobile device 3 has ever connected with the charging unit 1, for example, the App 30 will search and compare all user profile blocks 170, 180, etc. in the memory unit 17 of the charging unit 1 to confirm whether the content of the identity field 171 or the content of the identity field 181 is the same as that of the identification code of the mobile device 3, such as an IMEI number, so as to confirm whether the mobile device 3 has ever used the charging unit 1. If the mobile device 3 has not used the charging unit 1, then in step 1_1 (S1_1) in FIG. 3A, the App 30 will generate a user profile block 170 in the memory unit 17 of the charging unit 1, and the App 30 will write the identification code of the mobile device 3, such as the IMEI number, to the identity field 171 of the profile 170. Moreover, the user is also required to set the charging preferences 173 and the data backup preferences 174, and then go to the next step; and if the mobile device 3 has ever connected with the charging unit 1 before, go to the next step.

In step 2 (S2) in FIG. 3A, the App 30 will confirm whether the mobile device 3 has ever backed up data in the charging unit 1. For example, the App 30 will search the corresponding user profile block 170 in the memory unit 17 for whether there is a backup folder pointer 175, so as to confirm that the mobile device 3 has backed up data in the charging unit 1. If the mobile device 3 has not backed up data in the charging unit 1, then as shown in the figure in step 2_1 (S2_1), the App 30 will generate a backup folder 176 in the memory unit 17 of the charging unit 1, and create a backup folder pointer 175 in the user profile block 170 to point to the newly generated backup folder 176, and then go to next step; and if the mobile device 3 has backed up data in the charging unit 1, go to the next step.

Next, in step 3 (S3) in FIG. 3A, the App 30 will select the backup folder 176 pointed to by the backup folder pointer 175 in the user profile block 170 in step 2 (S2), and the selected backup folder 176 is used to store the backup data of the respective mobile device 3.

Next, in step 4 (S4) in FIG. 3A, the App 30 will first read a battery charge level of the mobile device 3 from the mobile device 3, and then the App 30 will confirm whether the battery charge level of the mobile device 3 is less than the expected charge level in the charging preferences 173; if the battery charge level of the mobile device 3 is less than the expected charge level in the charging preferences 173, then in step 4_1 (S4_1) in FIG. 3A, the App 30 will make the charging unit 1 charge the battery of the mobile device 3 for a unit time, such as one to ten minutes, and then return to step 4 (S4); if the battery charge level of the mobile device 3 is not less than the expected charge level in charging preferences 173, go to the next step.

Next, in step 5 (S5) in FIG. 3B, the App 30 sets the data transmission speed between the charging unit 1 and the mobile device 3 according to the data transmission speed option data in the backup preferences 174.

Next, in step 6 (S6) in FIG. 3B, the App 30 determines whether the App 30 should use a quick scan or a full scan according to the quick scan/full scan option data in the backup preferences 174 to scan the files accessible from the mobile device 3 such as photos and the files in the backup folder 176 such as photos, and compare the files in the mobile device 3 with the files in the backup folder 176 to confirm whether they are the same.

Wherein, the quick scan method means that when the App 30 backs up a batch of data files such as 100 photos for the first time, the App 30 will record the relevant information of the batch of data files, such as file names, file sizes, file dates, etc., as quick scan index data of the batch of data files. And the quick scan index data will be recorded in the mobile device 3 and the backup folder 176 respectively, and later on when comparing the files in the mobile device 3 with the files in the backup folder 176 to see whether they are the same, the App 30 only needs to check the quick scan index data to confirm whether the files in the mobile device 3 and the files in the backup folder 176 are the same. As for the full scan method, it means to compare all the files one by one between the mobile device 3 and the backup folder 176 to directly confirm whether the files are the same.

Next, in step 7 (S7) in FIG. 3B, according to the full backup/differential backup option data in the backup preferences 174, the App 30 determines whether it should use the full backup task or the differential backup task to back up files such as photos in the mobile device 3. In the same time, according to the local/cloud/both backup option data in the backup preferences 174, the App 30 determines whether the App 30 backs up only the local files 31 or only the cloud files 32 or both, which are accessible from the mobile device 3.

Wherein, the full backup task means that the App 30 backs up all the selected files from the mobile device 3 to the backup folder 176; as for the differential backup task, it means that the results of comparing the files in the mobile device 3 with the files in the backup folder 176 in step 6 (S6) are utilized by the App 30, such that among the selected files to be backed up from the mobile device 3, only those files that are different from the files in the backup folder 176 are backed up by the App 30; whereas those files that are the same as the files in the backup folder 176 are not backed up.

After completing the file backup in the above steps, then, in step 8 (S8) in FIG. 3B, according to the backup folder read-only option data in the backup preferences 174, the App 30 will determine whether to set the files in the backup folder 176 as read-only, so as to avoid accidental deletion or malicious hacking of the files; and at the same time, according to the backup folder password option data in the backup preferences 174, the App 30 will determine whether to set password protection for the files in the backup folder 176, so that a password will be required for opening the files, which further protects the files.

Next, in step 9 (S9) in FIG. 3B, according to the thumbnail option data in the backup preferences 174, the App 30 will determine whether to generate thumbnails for the files such as photos in the backup folder 176, and store the generated thumbnails in the backup folder 176, and store the quick scan index data generated in step 6 (S6) in the backup folder 176, which is equivalent to updating the quick scan index data, to facilitate subsequent backup and comparison actions.

In step 10 (S10) in FIG. 3B, the App 30 will read a battery charge level of the mobile device 3 again from the mobile device 3. If the battery is not fully charged, then in step 10_1 (S10_1) in FIG. 3B, the App 30 will make the charging unit 1 continue to charge the battery of the mobile device 3 for a unit time, and then return to step 10; and if the battery of the mobile device 3 is fully charged, the procedure ends.

From the above steps of the method for a charging unit that backs up data stored on a mobile device of the present invention, it can be seen that after the charging unit 1 is connected to the mobile device 3 and initialized, the App 30 can make the charging unit 1 and the mobile device 3 fully cooperated. Automatic charging can be accomplished and the file data accessible from the mobile device can be automatically backed up. This not only maintains the safety of the data file stored on the mobile device, but also minimizes the burden upon the users to back up data stored on the mobile device, therefore the urgent needs to automate the data backup process for a mobile device can effortlessly be achieved and the purpose of the present invention can be fulfilled.

The aforementioned are preferred embodiments of the present invention. It should be noted that for those of ordinary skill in the art, without departing from the principles of the present invention, certain improvements and retouches of the present invention can still be made which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for a charging unit that backs up data stored on a mobile device, providing a charging unit, and an application program (abbreviated as App) executed on the mobile device, the charging unit including a memory unit and the mobile device including a battery, and the method for a charging unit that backs up data stored on a mobile device including the following steps:
    S1: the App determining whether the mobile device has ever connected with the charging unit; if the mobile device has been previously connected with the charging unit, then read a set of charging preferences, and a set of backup preferences from a user profile block in the charging unit, and then the App jumping to S2;
    S1_1: the App creating a user profile block in the memory unit of the charging unit, and setting up the charging preferences and the backup preferences in the user profile block, the App providing user selectable options for the charging preferences and the backup preferences, wherein, the charging preferences include at least an expected charge level for the battery, the backup preferences include at least a backup scan process and a backup task, the backup scan process defines at least 1) performing a full scan, 2) performing a quick scan, the backup task defines 3) performing a full backup, 4) performing a differential backup, and 5) backing up files only stored locally and not on a cloud system, backing up files only stored locally and also stored on the cloud system, backing up all files stored locally on the mobile device;
    S2: the App determining whether the mobile device has ever backed up files in the charging unit; if the mobile device has ever backed up files in the charging unit, the App jumping to S3;
    S2_1: the App creating a new backup folder in the memory unit;
    S3: the App choosing a corresponding backup folder to store backup files from the mobile device;
    S4: the App determining whether a battery charge level of the battery of the mobile device is less than the expected charge level, and if the battery charge level is greater than or equal to the expected charge level, the App jumping to S5;
    S4_1: the App controlling the charging unit to charge the battery of the mobile device for a unit time, and returning to S4;
    S5: according to the backup preferences, the App setting a data transmission speed between the charging unit and the mobile device;
    S6: according to the backup preferences, the App performing a preselected backup scan process;
    S6_1: if a full scan is preselected, then all files in the mobile device are eligible for backup, then go to S7;
    S6_2: if a quick scan is preselected, then determine between the mobile device and the backup folder whether the files are the same; then files not in the backup folder are eligible for backup and then, creating quick scan index data for first time backup files;
    S7: according to the backup preferences, the App performing 1) a full backup task, by an initial connection between said mobile device and said charging unit, of the eligible files on said mobile device only stored as local files, or only eligible files on said mobile device previously sent as cloud files, or both eligible files stored as local files and eligible files on said mobile device previously sent to the cloud or 2) a differential backup task, by a subsequent connection between said mobile device and said charging unit, for eligible files on said mobile device only stored as local files, or only eligible files on said mobile device previously sent as cloud files, or both eligible files stored as local files and eligible files on said mobile device previously sent to the cloud.

2. The method for a charging unit that backs up data stored on a mobile device as claimed in claim 1, wherein the following steps are further included after step S7:
    S8: according to the backup preferences, the App determining whether to set the files in the backup folder as read-only, and whether to set password protection for the files in the backup folder;
    S9: according to the backup preferences, the App determining whether to generate thumbnails for the files in the backup folder; and the App updating the quick scan index data.

3. The method for a charging unit that backs up data stored on a mobile device as claimed in claim 1, wherein the following steps are further included before step S1:
    S0_0: the mobile device connected to the charging unit and the connection being authenticated;
    S0_1: the mobile device deciding whether the App has been installed, if the App is installed on the mobile device, then jumping to step 1;
    S0_2: the mobile device reminding the user of the mobile device to install the App.

4. The method for a charging unit that backs up data stored on a mobile device as claimed in claim 1, wherein the backup preferences include full backup/differential backup option data, and local/cloud/both backup option data.

5. The method for a charging unit that backs up data stored on a mobile device as claimed in claim 1, wherein the backup preferences include data transmission speed option data, quick scan/full scan option data, full backup/differential backup option data, and local/cloud/both backup option data.

6. The method for a charging unit that backs up data stored on a mobile device as claimed in claim 1, wherein when the App creates a backup folder, the App also creates a backup folder pointer in the user profile block to point to the backup folder.

7. The method for a charging unit that backs up data stored on a mobile device as claimed in claim 1, wherein, when the App creates a user profile block in the memory unit of the charging unit, the App also writes an identification code of the mobile device into the user profile block.

8. The method for a charging unit that backs up data stored on a mobile device as claimed in claim 1, wherein the differential backup task means that among the selected files to be backed up from the mobile device, only those files that are different from the files in the backup folder are backed up by the App.

9. The method for a charging unit that backs up data stored on a mobile device as claimed in claim 1, wherein when the App backs up a batch of data files for the first time, the App will record the relevant information including file names, file sizes and file dates of the batch of data files as quick scan index data of the batch of data files, and the quick scan index data is recorded in the mobile device and the backup folder respectively; and later on, when comparing the files in the mobile device with the files in the backup folder, the App only needs to check the quick scan index data to determine whether the files in the mobile device and the files in the backup folder are the same.

10. The method for a charging unit that backs up data stored on a mobile device as claimed in claim 2, wherein the following steps are further included after step S9:
   S10: the App determining whether the battery of the mobile device is fully charged, and if the battery is fully charged, the App then ending the procedure;
   S10_1: the App controlling the charging unit to charge the battery of the mobile device for a unit time, and returning to S10.

11. The method for a charging unit that backs up data stored on a mobile device as claimed in claim 2, wherein the backup preferences include data transmission speed option data, quick scan/full scan option data, full backup/differential backup option data, local/cloud/both backup option data, backup folder read-only option data, backup folder password option data, and thumbnail option data.

* * * * *